United States Patent
Haghighat et al.

(10) Patent No.: US 11,937,189 B2
(45) Date of Patent: Mar. 19, 2024

(54) ROBUST NOMA TRANSMISSION

(71) Applicant: InterDigital Patent Holdings, Inc., Wilmington, DE (US)

(72) Inventors: Afshin Haghighat, Ile-Bizard (CA); Loic Canonne-Velasquez, Dorval (CA); Moon-il Lee, Melville, NY (US); Shahrokh Nayeb Nazar, San Diego, CA (US); Prasanna Herath Mudiyanselage, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 167 days.

(21) Appl. No.: 17/293,548

(22) PCT Filed: Nov. 12, 2019

(86) PCT No.: PCT/US2019/060844
§ 371 (c)(1),
(2) Date: May 13, 2021

(87) PCT Pub. No.: WO2020/102144
PCT Pub. Date: May 22, 2020

(65) Prior Publication Data
US 2022/0007304 A1 Jan. 6, 2022

Related U.S. Application Data

(60) Provisional application No. 62/789,774, filed on Jan. 8, 2019, provisional application No. 62/760,085, filed on Nov. 13, 2018.

(51) Int. Cl.
*H04W 52/34* (2009.01)
*H04W 52/14* (2009.01)
(Continued)

(52) U.S. Cl.
CPC ......... *H04W 52/34* (2013.01); *H04W 52/146* (2013.01); *H04W 72/044* (2013.01); *H04W 72/56* (2023.01)

(58) Field of Classification Search
CPC ... H04W 52/34; H04W 72/56; H04W 52/146; H04W 72/044
See application file for complete search history.

(56) References Cited

U.S. PATENT DOCUMENTS

2011/0274022 A1 11/2011 Chen et al.
2017/0289984 A1 10/2017 Baligh et al.
(Continued)

FOREIGN PATENT DOCUMENTS

CN 106160987 A 11/2016
CN 107689859 A 2/2018
(Continued)

OTHER PUBLICATIONS

R1-167555, "NR Multiple Access", 3rd Generation Partnership Project (3GPP); TSG-RAN WG1 #86, Ericsson, Gothenburg, Sweden, Aug. 22-26, 2016, 5 pages.
(Continued)

*Primary Examiner* — John J Lee
(74) *Attorney, Agent, or Firm* — CONDO ROCCIA KOPTIW LLP

(57) ABSTRACT

Systems, methods, and instrumentalities are provided that are associated with multi-layer transmissions such as multi-layer NOMA transmissions. A per-layer perturbation pattern may be applied to the multiple layers to create differences among the transmission power levels of the layers. MAS and NOMA resource indications may be provided, e.g., through TCI state. Dynamic MAS and NOMA resource indications may be provided. Uplink CSI-RS techniques may be provided, e.g., for interference measurement.

20 Claims, 13 Drawing Sheets

(51) Int. Cl.
*H04W 72/044* (2023.01)
*H04W 72/56* (2023.01)

(56) References Cited

U.S. PATENT DOCUMENTS

| | | | |
|---|---|---|---|
| 2020/0029270 A1 | 1/2020 | Matsuda et al. | |
| 2020/0313836 A1* | 10/2020 | Kang | H04W 16/10 |
| 2020/0358557 A1* | 11/2020 | Park | H04L 27/2627 |

FOREIGN PATENT DOCUMENTS

| | | | | |
|---|---|---|---|---|
| CN | 108781448 A | 11/2018 | | |
| WO | 2017020680 A1 | 2/2017 | | |
| WO | WO-2017020680 A1 * | 2/2017 | ............... | H04B 7/04 |
| WO | 2018030158 A1 | 2/2018 | | |

OTHER PUBLICATIONS

Ren, Bin et al., "Pattern Matrix Design of PDMA for 5G UL Applications", China Communications, vol. 13, Supplement No. 2, Dec. 2016, 15 pages.

\* cited by examiner

ROBUST NOMA TRANSMISSION

CROSS-REFERENCE TO RELATED APPLICATIONS

This application is the National Stage Entry under 35 U.S.C. § 371 of Patent Cooperation Treaty Application No. PCT/US2019/060844, filed Nov. 12, 2019, which claims the benefit of Provisional U.S. Patent Application No. 62/760,085, filed Nov. 13, 2018, and Provisional U.S. Patent Application No. 62/789,774, filed Jan. 8, 2019, the disclosures of which are incorporated herein by reference in their entireties.

BACKGROUND

A basic multiple access scheme for wireless communications (e.g., where NR may be used as an example herein) may be orthogonal for downlink and uplink data transmissions, e.g., time and frequency physical resources of different users are not overlapped. Non-orthogonal multiple-access (NOMA) schemes may be used (e.g., where NR may be used as an example herein). As a carrier frequency increases, the path loss may become a limitation, e.g., to provide a sufficient coverage area. Transmission in millimetre wave systems may (e.g., additionally) suffer from non-line-of-sight losses, e.g., diffraction loss, penetration loss, oxygen absorption loss, foliage loss, etc. During initial access, a base station and WTRU may need to overcome path losses and discover each other. Utilizing many antenna elements to generate a beamformed signal may be a way to compensate for path loss, e.g., by providing beamforming gain. Beamforming techniques may include digital, analogue, and hybrid beamforming.

SUMMARY

Systems, methods, and instrumentalities are provided that are associated with multi-layer transmissions such as multi-layer NOMA transmissions. Perturbation patterns may be applied to different transmission layers to create differences among the transmission power levels of the layers. The perturbation patterns may be configured by a network and included in a codebook with each pattern corresponding to an indexed entry in the codebook. A specific perturbation pattern may be selected for a transmission layer based on the transmission characteristics of the layer including, for example, the transmission zone associated with the layer, a transmission resource associated with the layer, a signature associated with the layer, an antenna port associated with the layer, a priority associated with the layer, and/or a transmission beam associated with the layer. The perturbation patterns may be applied to the transmission layers on a symbol by symbol basis. Random precoding may be applied to further enhance diversity of the multiple layers.

Further, a determination may be made with regard to whether the multiple transmission layers are to be transmitted via a single antenna port or multiple antenna ports. Based on a determination that the transmission layers are to be transmitted via a single antenna port, a first transmission layer may be transmitted via the single antenna port at a first transmission power level and a second transmission layer may be transmitted via the single antenna port at a second transmission power level. Based on a determination that the multiple transmission layers are to be transmitted via multiple antenna ports, at least a portion of a first transmission layer may be transmitted via a first antenna port at a first transmission power and at least a portion of a second transmission layer may be transmitted via a second antenna port at a second transmission power.

DETAILED DESCRIPTION

A detailed description, including illustrative examples, will now be described, e.g., with reference to the various figures. Although this description may provide detailed examples of possible implementations, it should be noted that the details are intended as illustrative and in no way limit the scope of the application.

Figure 1A:
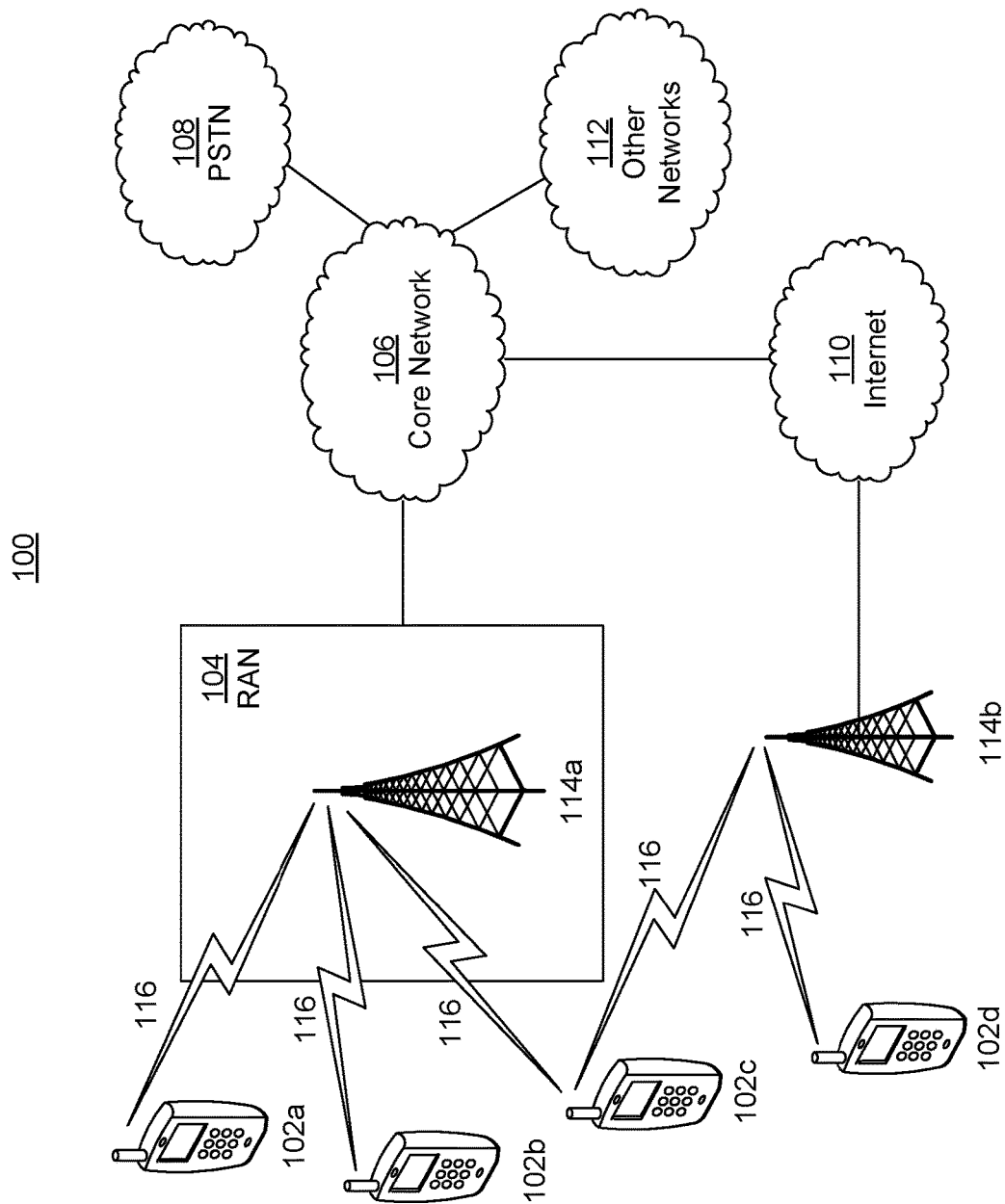
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
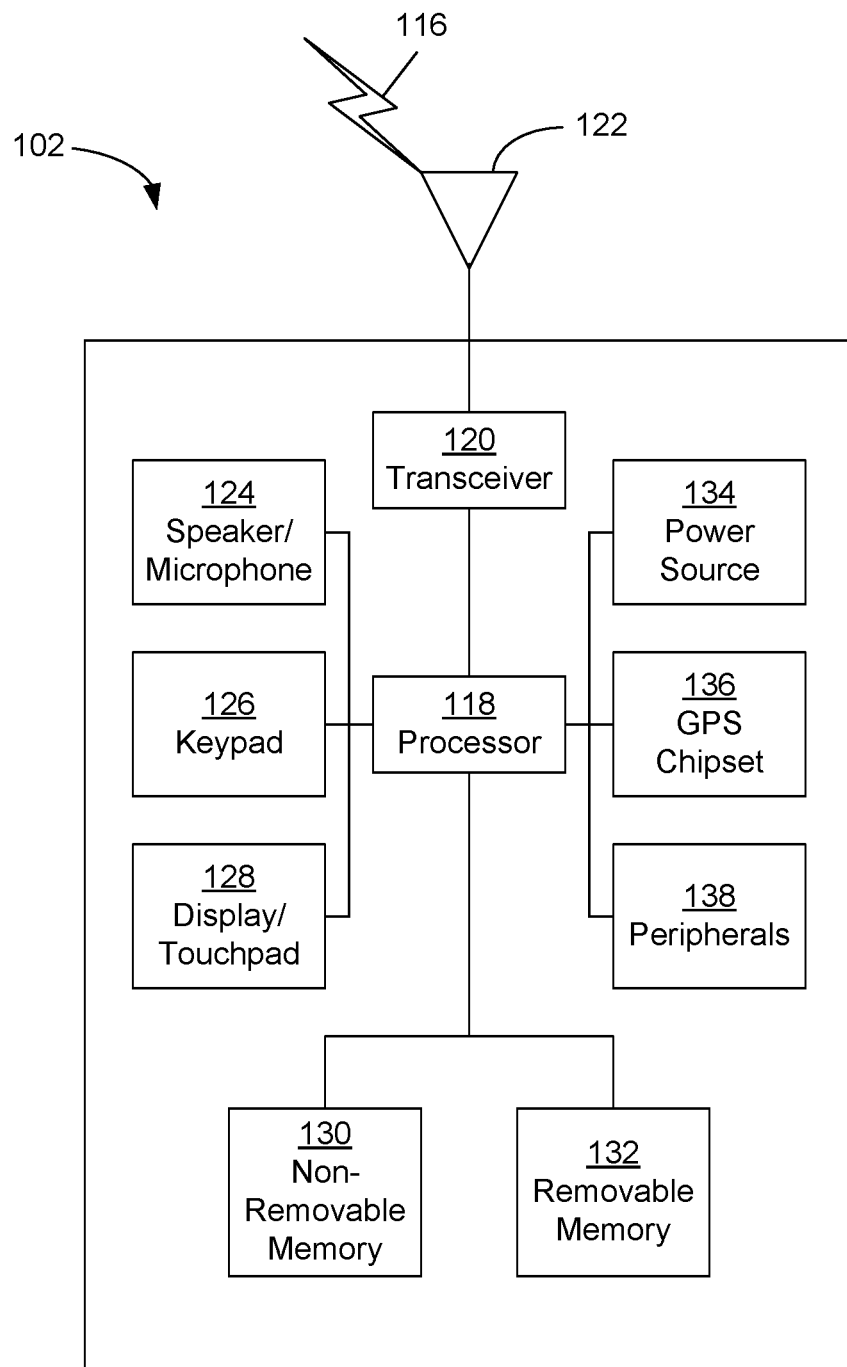
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
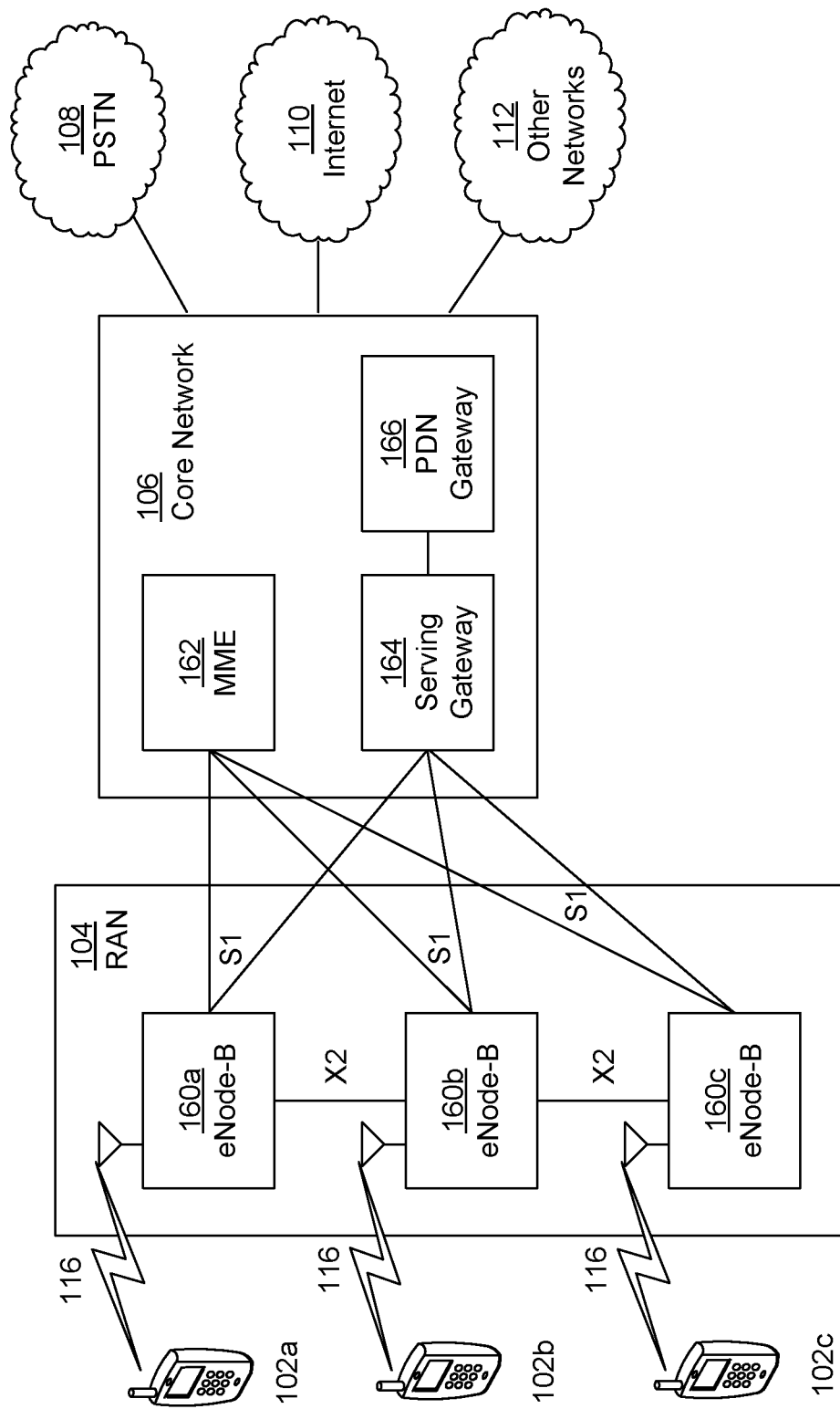
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
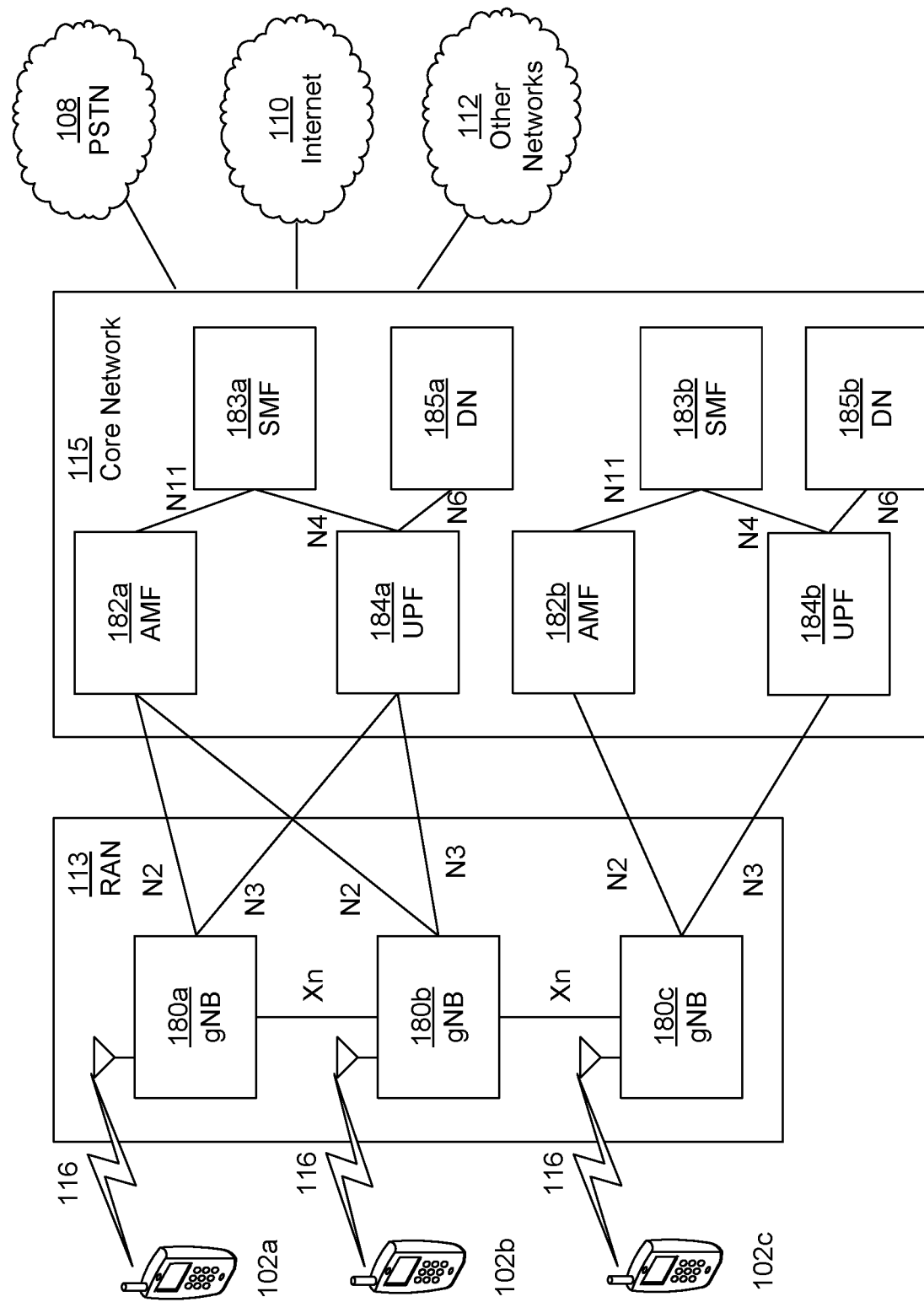
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

There may be a benefit associated with non-orthogonal multiple access in terms of UL link-level sum throughput and/or overloading capability. There may be a benefit of system capacity enhancement, e.g., in terms of supported packet arrival rate at given system outage.

For non-orthogonal multiple access, there may be interference between transmissions using overlapping resources. As the system load increases, this non-orthogonal characteristic may be more pronounced. To combat interference between non-orthogonal transmissions, transmitter side schemes such as spreading (linear or non-linear, with or without sparseness) and/or interleaving may be employed, e.g., to improve the performance and ease the burden of advanced receivers.

Non-orthogonal transmission may be applied to grant-based and/or grant-free transmission. Benefits of non-orthogonal multiple access, e.g., when enabling grant-free transmission, may encompass a variety of use cases or deployment scenarios, including eMBB, URLLC, mMTC, etc.

A Multiple Access Signature (MAS) may be used for NOMA transmissions, e.g., to enable a gNB receiver to uniquely identify a WTRU and separate NOMA transmissions from different WTRUs, etc. The MAS may be derived from one of the following; codebook/codeword, sequence, interleaver, resource element (RE) mapping, DMRS, preamble, spatial dimension or power (e.g., transmit power).

Figure 2:
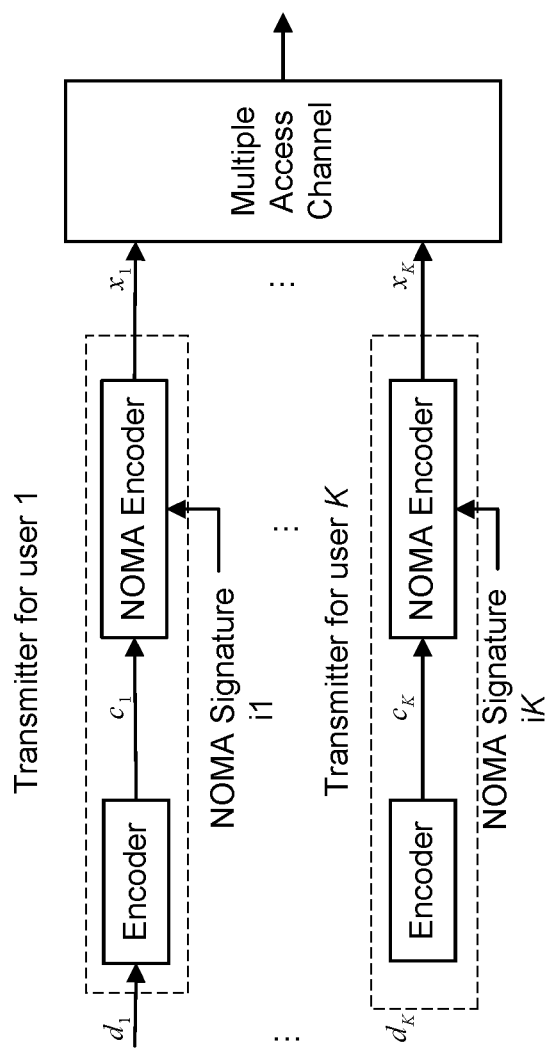
FIG. 2 illustrates an example multi-layer NOMA transmitter.

FIG. 2 illustrates an example multi-layer NOMA transmitter. A NOMA signature may a WTRU-specific signal attribute/feature of a transmit NOMA signal that may be used at the receiver to separate different users. A NOMA signature or MAS may represent codebook, interleaver seed, sequence parameters, etc., that may be used for creation and/or demodulation of a NOMA signal. A NOMA transmission may be in a form of grant-based (e.g., using resources assigned by a network) or grant-free (e.g., using resources autonomously selected by a WTRU) transmission. Grant-free transmission may be considered for RRC-CONNECTED state and/or INACTIVE/IDLE state.

NOMA transmission may be based on single or multi-layer transmission. In multi-layer transmission, a bit sequence may be divided into multiple portions each corresponding to a layer (e.g., a transmission layer). The transmission layers may be coded into symbol sequences (e.g., via an encoder and/or using one or more codewords) and transmitted via a single antenna port or multiple antenna ports. It may be that performance may be improved, e.g., by reducing the code-rate. In examples, a single codeword or multiple codewords may be used. In examples (e.g., with an M-layer NOMA transmission), N (N1) DMRS ports may be used. NOMA layer to antenna mapping can be done in any form, N M where M may be less than N (e.g., M<N), M may be equal to N (e.g., M=N), or M may be greater than N (e.g., M>N). DMRS for NOMA may maintain orthogonality. An extension to support a higher number of ports may be implemented.

Figure 3:
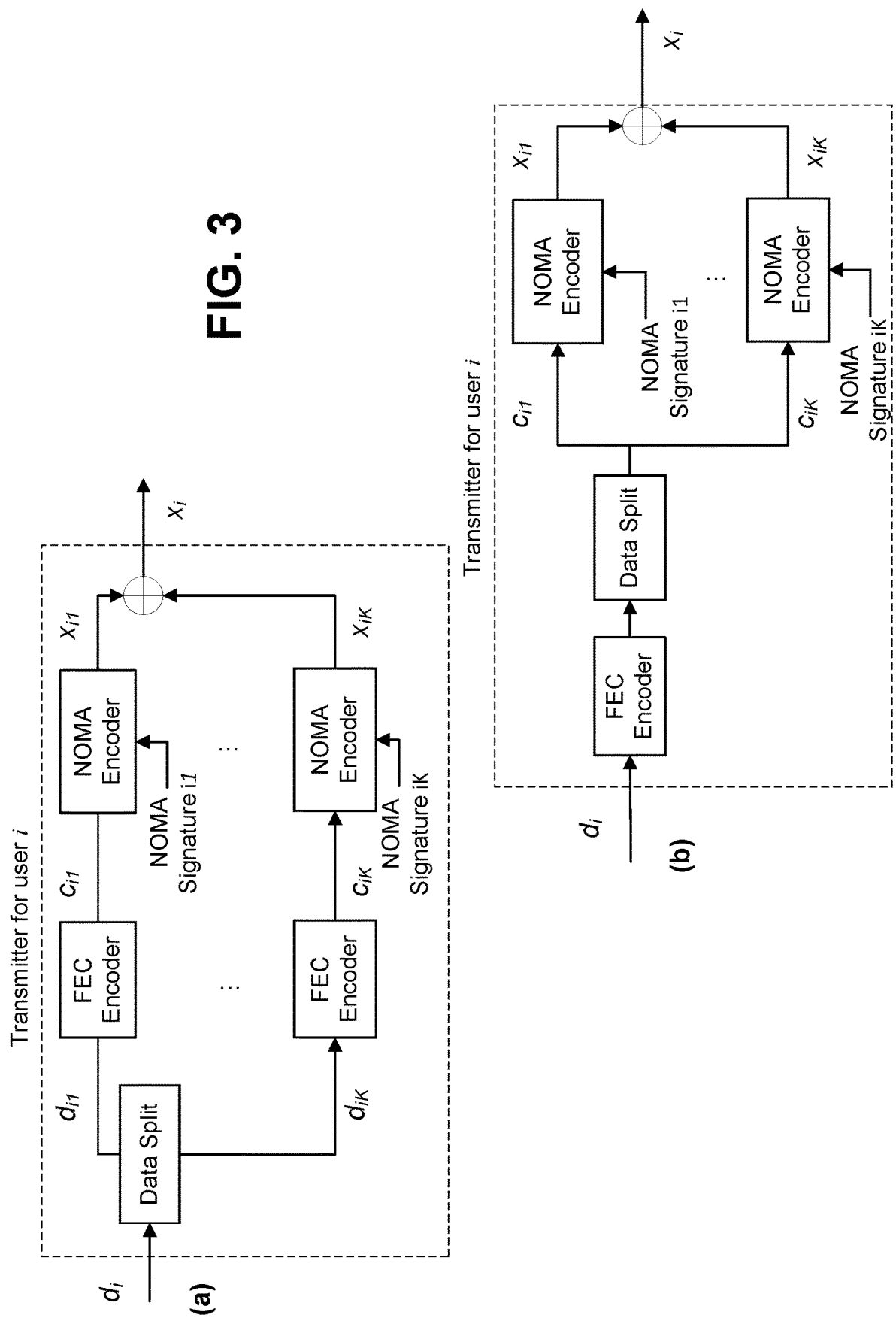
FIG. 3 illustrates an example of structures for implementing a multi-layer NOMA transmitter.

Multi-layer transmission (e.g., multi-layer NOMA transmission) may be used, e.g., to improve the performance of a communication system (e.g., a NOMA system). At a high level, multi-layer NOMA transmission techniques may include: having one Forward Error Correction (FEC) encoder per transmission; or having one FEC encoder per layer. FIG. 3 illustrates example structures for implementing a multi-layer NOMA transmitter. In a first example shown in FIG. 3(a), a bit sequence $d_i$ associated with a transmitter of user i is divided/spit into K portions, $d_{i1}$ through $d_{iK}$ (e.g., each portion may correspond to a transmission layer), and a respective FEC encoder is assigned to code each of the portions of the bit sequence. In a second example shown in FIG. 3(b), one FEC encoder is assigned to code the entire bit sequence $d_i$ before the coded sequence is divided/split into multiple portions.

In a multi-layer transmission (e.g., a multi-layer NOMA transmission), layers may be sent over the same antenna port. This may lead to some performance issues, e.g., since multiple layers effectively are transmitted through the same channel. A WTRU (e.g., a NOMA WTRU) may determine MAS and/or NOMA resource information, e.g., without much additional signaling overhead. A NOMA transmission may require dynamic MAS and/or resource mapping mechanisms, e.g., to increase diversity and robustness. An uplink CSI-RS process for interference measurement may be used, e.g., to facilitate detection and decoding of transmissions, for example by a gNB multi-user detection (MUD) receiver.

In the case of an NOMA transmission with multiple layers, the layers may be transmitted via the same channel and may experience the same variations that may impact NOMA performance. One or more of the following may be used, e.g., for introducing diversity for multi-layer transmission: per layer power perturbation (PLPP), per layer delay insertion, or random precoding.

Dynamic per layer power perturbation (PLPP) may be implemented by applying respective perturbation patterns to one or more users (e.g., WTRUs) and/or transmission layers. A perturbation pattern $p_{ik}$ may be defined for each user i (e.g., WTRU) and/or transmission layer k. Such a perturbation pattern may correspond to how power offsets (e.g., artificial power offsets) are applied along the time and/or frequency domain (e.g., how power offsets are applied in different time and/or frequence resources). The perturbation pattern $p_{ik}$ may be associated with a plurality of factors (e.g., aspects of the transmission that over which the perturbation pattern may be applied). For example, the perturbation pattern $p_{ik}$ may be associated with $p_{ik}(n,l)$ complex factors, where i and k may represent the user and layer indices, respectively, and n and l may represent the time and frequency indices of the transmission RE, respectively. As such, $p_{ik}(n,l)$ may represent that a perturbation pattern $p_{ik}$ is applied to user i, layer k, and time/frequency resources n and l. The perturbation described herein may create artificial power differences (e.g., power offsets) between layers. With these power differences, the layers may be differentiable at the receiver, e.g., even if they are transmitted jointly on the same channel. The power difference due to the perturbation may be beneficial at the receiver's MUD, e.g., to separate and decode the layers.

Figure 4:
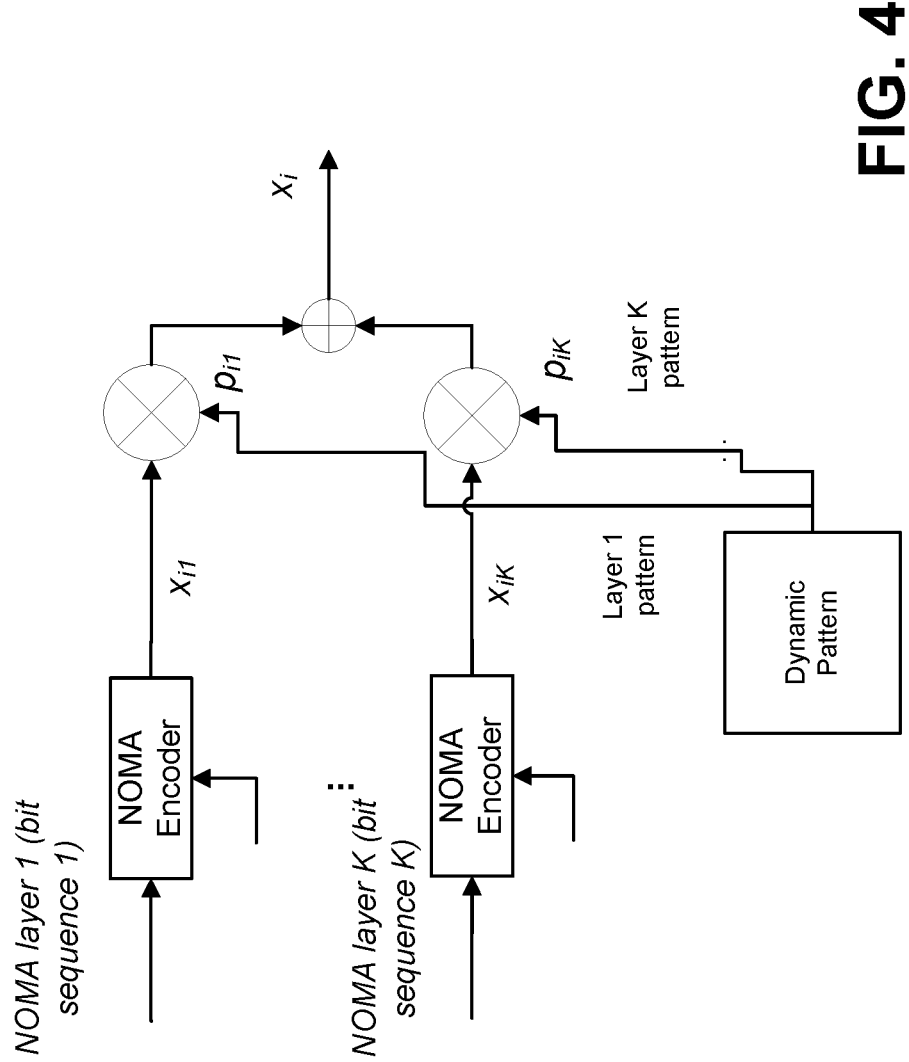
FIG. 4 illustrates an example of K-layer NOMA transmission with PLPP.

An example of K-layer NOMA transmission with PLPP is shown in FIG. 4. The power of NOMA symbols on each transmission layer may be changed, e.g., according to $p_{ik}(n, l)$ value. For example, the dynamic perturbation may be implemented by applying a power scaling factor $x_{ik}(n,l)$ to the perturbation factor $p_{ik}(n,l)$, e.g., $p_{ik}(n,l) \times x_{ik}(n,l)$. The total transmit power may not be changed, e.g., it may be maintained at the nominal value.

In examples, PLPP may be implemented on a symbol by symbol basis (e.g., in time domain), which may ensure the transmit power constraint is satisfied. In examples, a power shift may be applied in frequency domain, e.g., to implement a shift of the power from subsets of REs to other subsets within the same symbol.

The parameters for a perturbation mechanism may be preconfigured, for example at the WTRU jointly with other NOMA parameters such as MAS, NOMA transmission resources, etc. The parameters for a perturbation mechanism may include one or more of the following: information about the time/frequency pattern (e.g., whether the pattern should be applied in one or more symbols in the time domain, one or more frequency resources in the frequency, or in both the time and frequency domains, how often the pattern repeats itself, etc.), $p_{ik}(n,l)$ factors (e.g., the specific time/frequency resources in which perturbation is to be effectuated), the power offset values (e.g., scaling factors) to the applied, etc. The time/frequency pattern may be periodic or based on a pseudo-random signal (e.g., the pattern may be randomly applied based on a pseudo-random sequence). The perturbation pattern may be applied in time, frequency, or both. A cycle of the repetition may be defined based on symbol and/or RB indices, slot number, frame number, etc. The amount of perturbation (e.g., power offsets) corresponding to the perturbation factors $p_{ik}(n,l)$ may be configurable and/or defined (e.g., by a network) based on the number of layers. There may be two or more levels (e.g., two or more sets of power offset values). For example, in a two-layer transmission, three (2+1) sets of values may be applied. A first set of values may correspond to a set of maximum values within a certain range (e.g., largest power offsets or scaling factors), e.g., $p_{ik}(n,l)=p_{max}$. When these values are applied, a large (e.g., the largest) power offset may be created. A second set of values may correspond to a set of minimum values (e.g., smallest power offsets or scaling factors), e.g., $p_{ik}(n,l)=p_{min}$. When these values are applied, a small (e.g., the smallest) power offset may be created. A third set of values may comprise all ones, e.g., $p_{ik}(n,l)=1$, which may indicate that no perturbation is to be applied (e.g., no artificial power offset is to be created).

Figure 5:
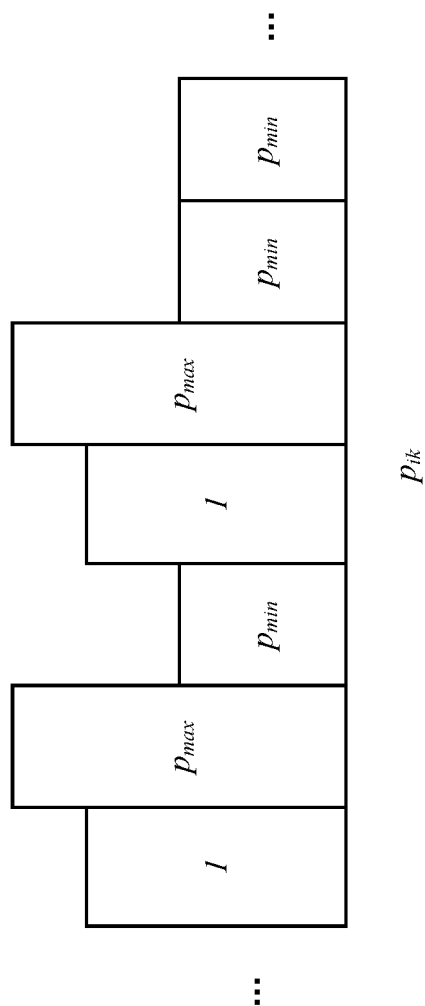
FIG. 5 illustrates an example definition of a 3-state perturbation pattern.

FIG. 5 shows an example definition of a 3-state perturbation pattern, $p_{ik}(n,l)$, that may be applied to the ith user (e.g., WTRU) and kth transmission layer. The three states comprised in the perturbation pattern may include, for example, $p_{min}$, $p_{max}$ and 1. $p_{min}$ as described above. As indicated by n and l indices, the perturbation (e.g., each instance of the perturbation) shown in FIG. 5, $p_{ik}(n,l)$, may be applied (e.g., per symbol and/or per layer) in the time domain and/or in the frequency domain (e.g., at an RE level). In examples (e.g., in case of frequency domain perturbation), an RE or group of REs (e.g., each RE or group of REs) per layer may be scaled (e.g., scaled differently). In examples, the total transmit power for a transmission layer may or may not change when each RE or group of REs associated with the transmission layer are scaled differently. The perturbation pattern may be applied in a joint time and frequency manner. In FIG. 5, "1" may indicate that there is no perturbation on resource (n, 1).

A predefined set of perturbation mechanism may be defined. The perturbation mechanism may be defined, for example, as a codebook where each entry of the codebook may comprise (e.g., contain) information about the perturbation process, e.g., one or more of: perturbation pattern, perturbation factor(s), etc. In a codebook-based implementation, each entry of the codebook may be indicated to a WTRU, e.g., by using an index. For example, a network (e.g., a gNB) may transmit configuration information about the codebook to a WTRU via higher layer signaling (e.g., in one or more RRC messages). The network may indicate which entry of the codebook is to be applied by the WTRU by specifying the index of the entry to the WTRU (e.g., via downlink control information or DCI).

A codebook may be pre-defined (e.g., by standards and/or signaled by a network via higher layer signaling). A codebook may be semi-statically configured (e.g., predefined/preconfigured by a network via higher layer signaling and subsequently activated/deactivate by the network, e.g., via DCI). A WTRU may receive an indication, e.g., dynamically (e.g., via DCI) or semi-statically (e.g., configured by network and subsequently activated/deactivated via DCI), to adapt all or some of the information related to the perturbation process. For example, a WTRU may receive an indication of an index associated with an entry in the codebook. Based on information comprised in the codebook entry, the WTRU may generate a random sequence or pattern (e.g., based on a WTRU-selected seed or network-configured seed) to be applied as perturbation to a transmission layer. The WTRU may indicate its codebook selection and/or the generated random sequence/pattern to the network. This way, different perturbation patterns may be dynamically configured and/or applied (e.g., activated or deactivated) for different WTRUs, different types of transmissions, different layers, etc.

One or more perturbation parameters (e.g., predefined set(s) of one or more perturbation parameters), such as time/frequency pattern(s), power scaling factor(s), etc., may be used. A WTRU may be pre-configured with, or it may receive dynamically or semi-statically such a parameter or one or more sets of such parameters, as described herein.

A WTRU may select and/or apply one or more perturbation parameters such as time/frequency pattern(s), power scaling factor(s), etc., based on one or more of the following operational situations.

A WTRU may determine and/or apply one or more perturbation parameters such as time/frequency pattern(s), power scaling factor(s), etc., based on another transmission parameter(s). For example, the one or more perturbation parameters may be determined and/or applied based on NOMA transmission parameter(s), such as NOMA zone (e.g., time/frequency NOMA resources (zones)), MA signature, preamble, DMRS configuration, etc. For example, a first set of perturbation parameters may be determined and/or applied when a first NOMA transmission parameter (s), such as a first NOMA zone (e.g., time/frequency NOMA resources (zones)), a first MA signature, a first preamble, and/or a first DMRS configuration is used, and a second set of perturbation parameters may be determined and/or applied when a second NOMA transmission parameter(s), such as a second NOMA zone (e.g., time/frequency NOMA resources (zones)), a second MA signature, a second preamble, and/or a second DMRS configuration is used.

A WTRU may determine and/or apply one or more of perturbation parameters based on a combination of adopted MCSs for NOMA layers. For example, a WTRU may increase the periodicity or duration (e.g., determine and/or apply a higher periodicity or duration) during which a relative positive power offset is applied on a layer if that layer has (e.g., is associated with) a higher code-rate or modulation order (e.g., if the code-rate or modulation order exceeds a certain threshold).

A multi-layer transmission (e.g., a multi-layer NOMA transmission) may be conducted using one or more antenna ports. A WTRU may determine and/or apply one or more perturbation parameters based on the number of antenna ports that the WTRU may use to perform a transmission. For example, with a single-antenna port (e.g., multiple layers are configured to be transmitted via one antenna port), a WTRU may select and/or apply perturbation parameter(s) (e.g., one or more sets of perturbation parameters) that may lead to a larger power offset being created on the layers. A WTRU with multiple antenna ports may use a less order of perturbation (e.g., in terms of power offset and/or periodicity), e.g., due to potential higher spatial diversity associated with the multiple antenna.

A WTRU may determine and/or select one or more perturbation parameters based on one or more spatial channel transmission properties, such as transmission beam, transmission configuration index (TCI) state, beam index, SRS port, antenna panel (e.g., a group of antennas installed on a panel), coherency (e.g., fully coherent, partially coherent, non-coherent), etc. A WTRU may select and/or apply one or more perturbation parameters from a pre-defined table. the table may be indexed, for example, by at least one spatial channel transmission properties such as, e.g., TCI state.

A WTRU may determine and/or select one or more perturbation parameters according to one or more of traffic type, number of (re-)transmissions, priority, or expected reliability. In examples, a WTRU may select/apply perturbation parameters so as to increase the periodicity and/or duration (e.g., select and/or apply a higher periodicity and/or duration) during which a relative positive power offset is applied to a layer if the layer carries higher reliability traffic. In examples, a WTRU may select/apply perturbation parameters so as to increase the power offset created for a layer if the layer carries higher reliability traffic.

In an example per layer perturbation for multi-layer NOMA, e.g., the example shown in FIG. 4, a dynamic perturbation pattern may be defined based on other system parameters. For example, the dynamic pattern may be selected to minimize the PAPR characteristics of the multi-layer transmission. The selected pattern may consider the data payload to define the perturbation factors. A WTRU may select perturbation factors from a collection of pre-configured sets, e.g., that may result in the least PAPR or any other similar metrics. The indication of the selected pattern may be done implicitly through other transmission aspects, e.g., DMRS pattern, DMRS scrambling sequence, MAS, etc.

Figure 6:
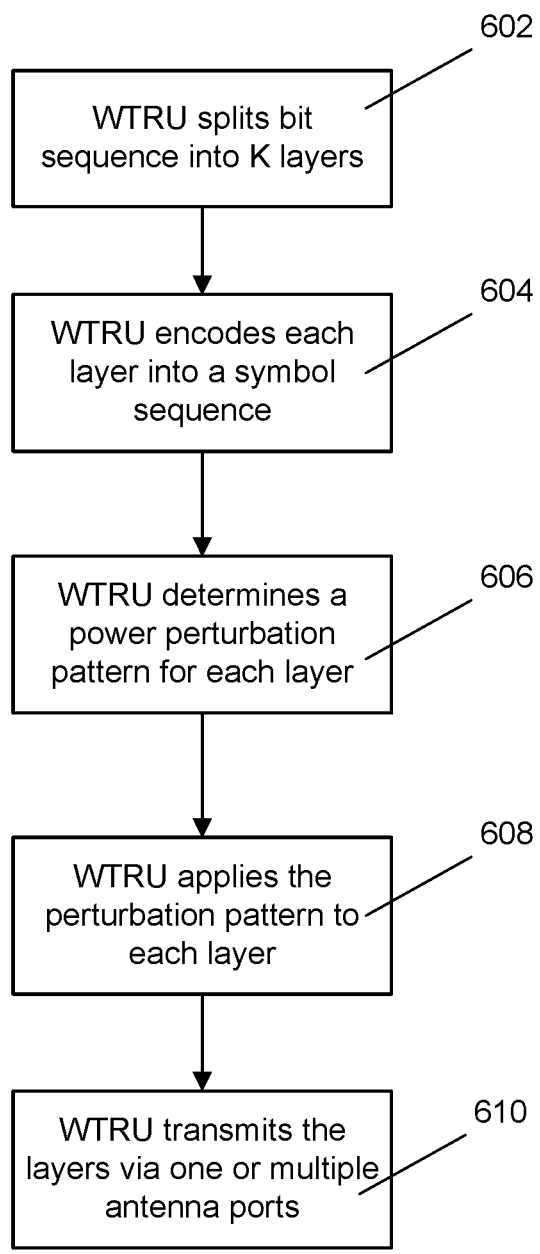
FIG. 6 illustrates example power perturbation operations that may be performed by a WTRU.

FIG. 6 is a block diagram illustrating example perturbation operations that may be performed by a WTRU. At 602, the WTRU may split a bit sequence to be transmitted into K sub-sequences or transmission layers. At 604, the WTRU may encode each transmission layer into a symbol sequence, e.g., using a NOMA encoder. At 606, the WTRU may determine a power perturbation pattern for each transmission layer, as described herein. At 608, the WTRU may apply the determined power perturbation pattern to each transmission layer, e.g., by multiplying the pattern with the encoded transmission layer on a symbol-by-symbol basis. The perturbation may lead to the transmit power of the K transmission layers being offset from each other, which may enhance the diversity of the transmission layers and improve decoding performance at a receiver. At 610, the WTRU may transmit the K transmission layers using the transmit power derived from the perturbation operation. The layers may be transmitted via a single antenna port or multiple antenna ports. When a single antenna port is used for the transmission, the WTRU may combine (e.g., sum up) the K layers into one sequence before transmitting the combined sequence via the single antenna port.

Figure 7:
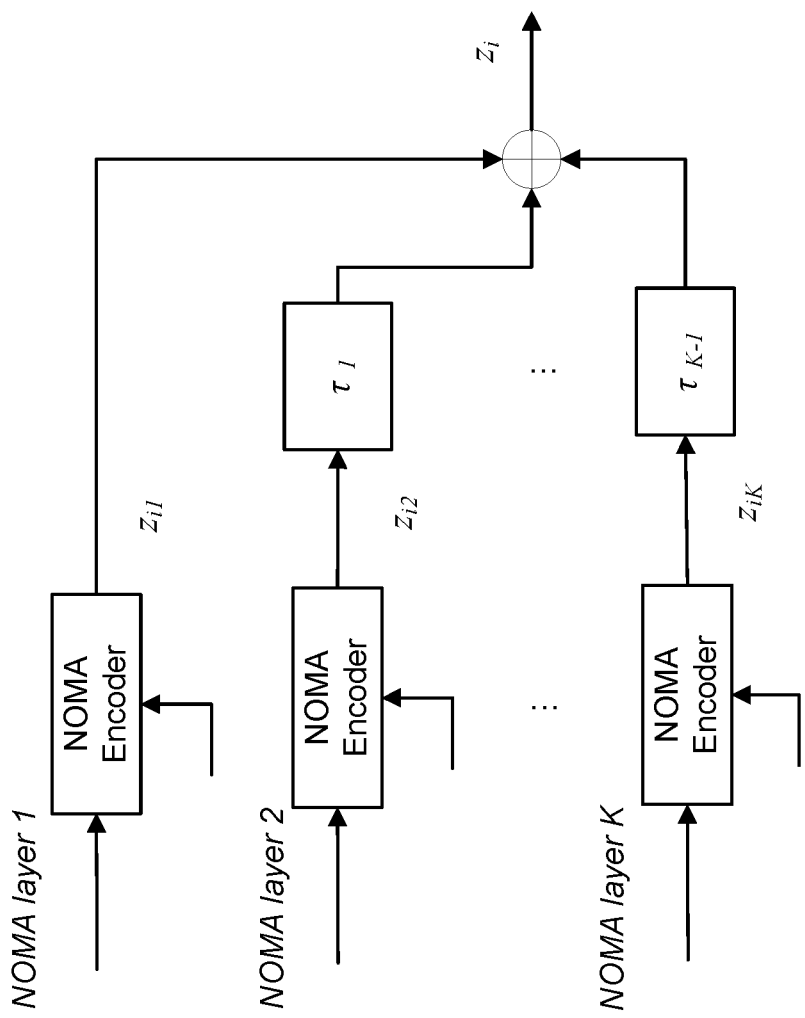
FIG. 7 illustrates an example of multi-layer NOMA transmission with PLDI.

NOMA diversity may be induced between the transmission layers by per layer delay insertion (PLDI). FIG. 7 illustrates an example of multi-layer NOMA transmission with PLDI, e.g., where $z_{ik}$ may be the time domain representation of the $k_{th}$ NOMA layer of user i. The time domain NOMA signal of user i may be precoded and transmitted on the actual antenna ports. For example, the number of NOMA layers may be different from a number of MIMO layers. As an illustration, a 2-layer NOMA transmission may be mapped on a variable number of antennas, e.g., any number of antennas, one or more.

A WTRU may be pre-configured (e.g., by a network) with a set of delay values. Each of these delay values may correspond to a transmission delay to be applied, e.g., to a layer. The delay values may be WTRU-specific or be configured for a group of WTRUs. A WTRU may receive an indication (e.g., from a network entity such as a gNB) to change the delay values. A WTRU may receive multiple sets of delay values to select based on one or more of the following example criteria: DL measurement (e.g., pathloss or SNR), MCS, MAS, NOMA resource, DMRS port, antenna panel, TCI state, path delay, TA information, etc.

NOMA diversity with a random precoder may be described. One or more of the following may apply.

Figure 8:
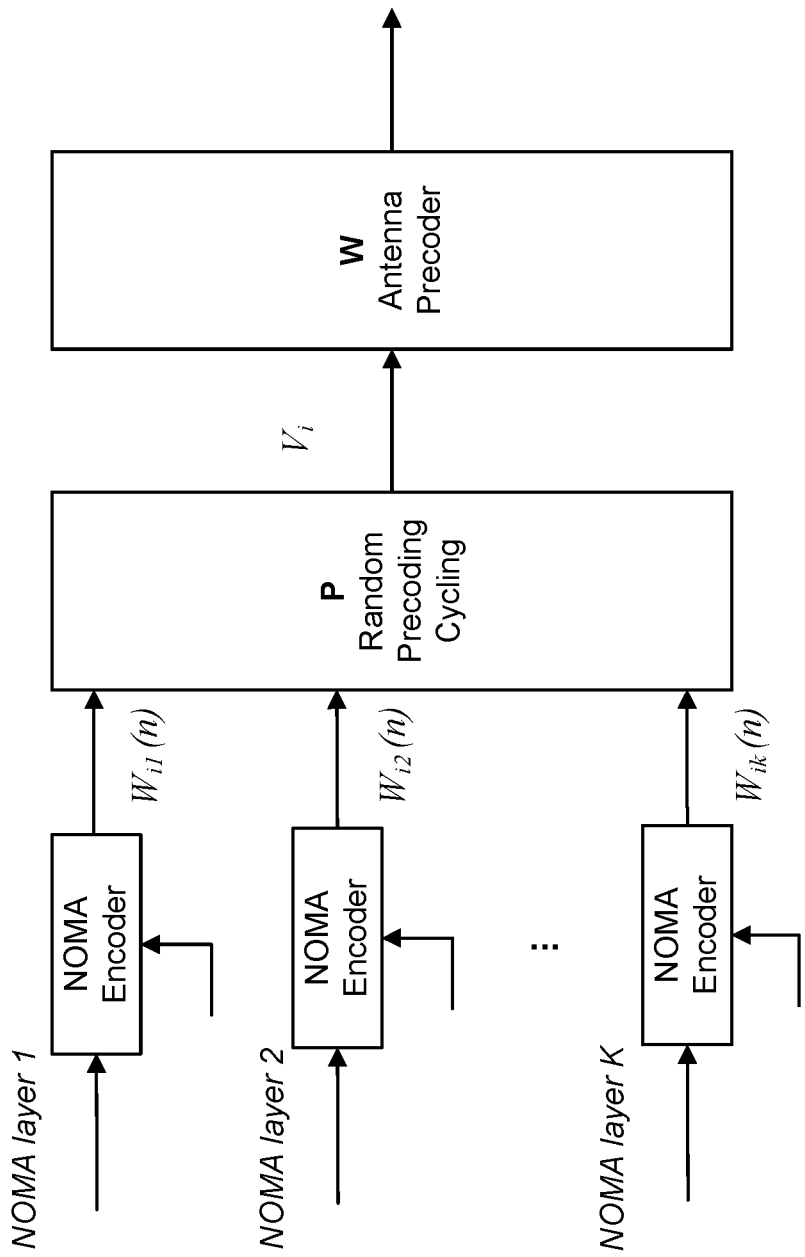
FIG. 8 illustrates an example multi-layer NOMA transmission with random precoding.

A technique to induce diversity between transmission layers may include introducing a random precoder. FIG. 8 illustrates an example multi-layer NOMA transmission with random precoding, where $w_{ik}$ may be the frequency domain representation of the kth NOMA layer of user i. The precoder P may be designed to maintain unity power at the output. The NOMA signal $v_i$ of user i may be later precoded, e.g., for transmission on the actual antenna ports.

A WTRU may be pre-configured (e.g., by a network) with a codebook set including (e.g., containing) different precoders. The layers may be grouped to several subsets to be precoded with the same precoder, each layer may be precoded independently, etc. Each precoder P may be in a form of a matrix or vector where its number of rows may represent the number of subgroups for precoding. The number of columns in P may represent the order or transmission rank. The signal vector $v_i$ of user i may be precoded (e.g., further precoded) and/or beamformed by W, e.g., for transmission on the actual antenna ports.

A WTRU may select a precoder by cycling through available precoders, e.g., randomly. For example, a WTRU may select a precoder by cycling through available precoders based on a pseudo-random or a periodic pattern. A WTRU may receive sets of codebooks to select based on one or more of the following example criteria: WTRU ID, DL measurement (e.g., pathloss or SNR), inter/intra interference, MCS, MAS, traffic type, NOMA resource, DMRS port, antenna panel, TCI state, path delay, TA information, etc. The selection pattern of precoder cycling may be WTRU-specific. The selection pattern of precoder cycling may be based on one or more of the following example parameters: WTRU ID, cell ID, etc.

There may be a MAS/NOMA resource linkage to TCI state. One or more multiple access signatures (MASs) may be used to multiplex one or more uplink signals from different WTRUs and/or different layers. A MAS may be determined based on one or more of: a sequence with a unique identity; a subset of subcarriers and/or symbols in scheduled resources with a unique pattern; an antenna port number (or antenna port index) selected or indicated; a scrambling identity indicated, configured, or used for associated demodulation RS; a subset of PRBs within the scheduled resources; a transmission power level or value; a timing advance level or value; or a frequency hopping pattern within a slot, subframe, frame, or aggregated slot.

In examples, a MAS may be used to transmit a single data stream. Multiple MASs may be used if a WTRU transmits more than one data stream (e.g., transmission rank for a PUSCH is higher than one), wherein the number of data streams may determine the transmission rank. The number of rank, number of layers, transmission rank, and rank may be interchangeably used.

A WTRU may be indicated or configured with a set of MASs. The WTRU may determine a subset of MASs for an UL transmission (e.g., PUSCH or PUCCH) based on one or more of following: an indicated TCI state; an indicated transmission rank; an indicated DM-RS port index; a WTRU-ID (e.g., C-RNTI); a slot, subframe, and/or frame index; or an associated panel for the UL transmission. One or more of the following may apply. A TCI state may be indicated for the UL transmission, e.g., where the TCI state may be used to indicate QCL-ed downlink RS (e.g., CSI-RS index or SSB index) and/or uplink RS (e.g., SRS index) for the UL transmission. A WTRU may determine an uplink beam based on the TCI state indicated. A DM-RS port index may be indicated for the UL transmission. For example, a first MAS in the set may be used if a first DM-RS port is indicated in the associated DCI for a PUSCH transmission, while a second MAS in the set may be used if a second DM-RS port is indicated. The first MAS and the second MAS may be different. The first DM-RS port and the second DM-RS port may be different, where the first DM-RS port and the second DM-RS port may be determined based on the associated CDM group. For example, a DM-RS port in a first CDM group may be determined or considered as a first DM-RS port and a DM-RS port in a second CDM group may be determined or considered as a second DM-RS port. An associated panel may be used for the UL transmission. A WTRU may use a different MAS based on which uplink panel is associated with the UL transmission.

A WTRU may be configured/indicated a set of MASs. The WTRU may determine a subset of the configured/indicated MASes to report, inform, or indicate one or more of the following, e.g., to a gNB: a preferred beam index, HARQ-ACK information, or CSI information. One or more of the following may apply. A preferred beam index may be used. For example, a WTRU may be configured with an association between MAS and beam reference signal (e.g., CSI-RS, SSB) and the WTRU may determine a MAS to report, indicate, or inform to a gNB a preferred beam index (e.g., beam reference signal index). The beam selection may be based on measurement of the beam reference signals associated with MASs. HARQ-ACK information may be used. If the UL transmission is overlapped with HARQ-ACK transmission, the WTRU may select or determine a MAS from the set to indicate HARQ-ACK associated with a downlink transmission that occurred previously. CSI information may be used, where the CSI information may include one or more of the following: CRI, RI, PMI, or CQI.

Dynamic MAS and NOMA resource mechanisms may be provided. The WTRU may be configured with multiple access signatures (MASs) and the MASs may be changed over the time frequency resources allocated for UL transmission (e.g., PUSCH, PUCCH, and/or PRACH), e.g., in order to randomize the interference among different WTRUs that are simultaneously transmitting in the UL. The WTRU may dynamically determine the assigned MASs for UL transmission based on one or more of the following MAS hopping schemes: OFDM symbol MAS hopping; intra-slot MAS hopping; inter-slot MAS hopping; mini-slot MAS hopping; PRB MAS hopping; partial-PRB MAS hopping; BWP MAS hopping; or carrier MAS hopping.

OFDM symbol MAS hopping may be used. Each OFDM symbol within a slot may be associated with a different MAS, e.g., the MAS may hop across multiple consecutive OFDM symbols. The WTRU may determine the MAS for each symbol allocated/configured for PUSCH/PUCCH transmission, e.g., based on the OFDM symbol index within the slot.

Intra-slot MAS hopping may be used. Each half of the UL physical channel (e.g., PUSCH or PUCCH) may be associated with a different MAS. The WTRU may determine a first MAS for the first hop used for transmitting the first half of PUSCH/PUCCH symbols in a slot and a second MAS for the second hop comprising the second half or the remaining PUSCH/PUCCH symbols. The MAS for each hop within the slot could be associated with one or more of the following: a DM-RS port assigned for transmission in each half of the slot; a CSI-RS resource index assigned for transmission in each half of the slot; or a SRS resource index.

Inter-slot MAS hopping may be used. In case of slot repetition, each slot may be associated with a different MAS, e.g., wherein the MAS may hop across multiple consecutive slots. The WTRU may determine the MAS for each slot based on one or more of the following: a slot index within the subframe/frame; a front-loaded DM-RS port assigned to each slot; a CSI-RS resource index assigned to each slot; or an SRS resource index (e.g., SRI) assigned to each slot.

Mini-slot MAS hopping may be used. In case of mini-slot repetition, each mini-slot may be associated with a different MAS, e.g., wherein the MAS may hop across multiple consecutive mini-slots. The WTRU may determine the MAS for each mini-slot based on one or more of the following: a mini-slot index within the slot/subframe/frame; a starting OFDM symbol within the slot for each mini-slot; a DM-RS port for each mini-slot, etc.

PRB MAS hopping may be used. In case the WTRU is scheduled/configured for UL transmission over multiple PRBs, the MAS for each PRB may be different. The WTRU may determine the MAS for each PRB based on one or more of the following: a PRB index within the allocated PUSCH/PUCCH; a PRB index within the active BWP; or a PRB index within the carrier.

Partial-PRB MAS hopping may be used. In case the WTRU is scheduled/configured for UL transmission over one or multiple PRBs, the MAS for each part of a PRB may be different. The WTRU may determine the MAS for each part of a PRB based on one or more of the following: a partial PRB index within each PRB; a PRB index within the allocated PUSCH/PUCCH; a PRB index within the active BWP; or a PRB index within the carrier.

BWP MAS hopping may be used. In case the WTRU is configured with multiple BWPs for UL transmission, the MAS for each BWP may be different. The WTRU may determine the MAS for each BWP based on one or more of the following: a BWP index; a CORESET index used for initial access in each BWP; or a search space index used for initial access in each BWP.

Carrier MAS hopping may be used. In case the WTRU is configured with multiple component carriers for UL transmission using carrier aggregation, the MAS for each component carrier may be different. The WTRU may determine the MAS for each component carrier based on one or more of the following: a component carrier index; a cell index; a BWP index; a CORESET index used for initial access in each carrier/BWP; or a search space index used for initial access in each carrier/BWP.

CSI-RS for uplink NOMA may be provided. In uplink multi-user implementations, such as NOMA, a WTRU may apply a specific uplink transmission technique to allow inter-cell or intra-cell interference measurement by the gNB. The details of such technique(s) may be illustrated considering an uplink NOMA system, but may be applicable to other scenarios such as other multi-user implementations. A WTRU may be configured with a set of parameters for NOMA transmission. The WTRU may determine a set of parameters for NOMA transmission. The parameter set may include information, e.g., such as (time/frequency) resources, MAS information, etc.

Figure 9:
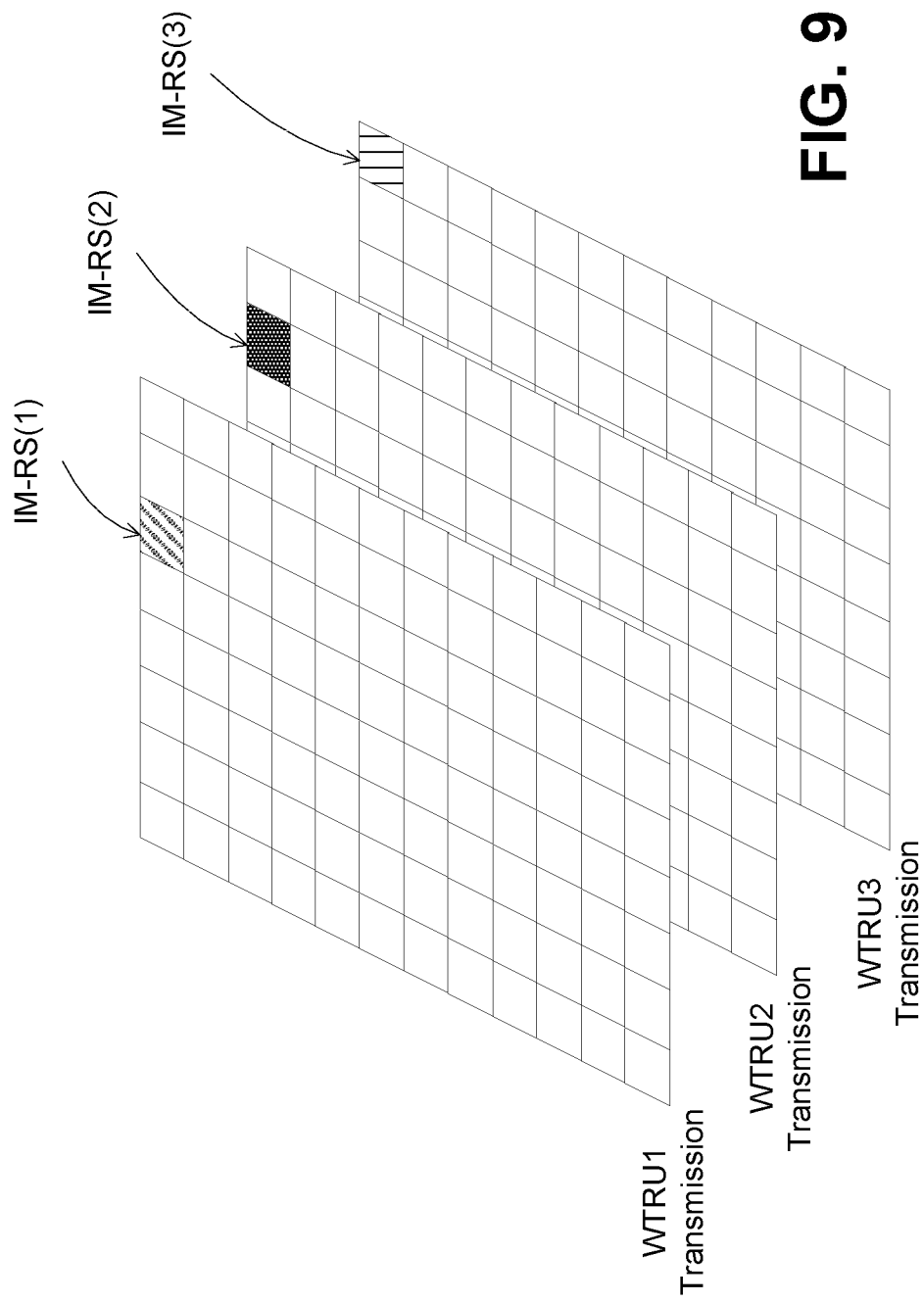
FIG. 9 illustrates an example of IM-RS for interference measurement in an uplink NOMA transmission.

A WTRU may not transmit on all the allocated PUSCH NOMA resources. The unused PUSCH resources may be considered as uplink CSI-RS resources that may be used for interference measurement, e.g., by a gNB. Such CSI-RS may be referred to as interference measurement RS (IM-RS). FIG. 9 shows an example of IM-RS for interference measurement in an uplink NOMA transmission. In the example, WTRU 1 is configured with IM-RS(1), which may allow measurements on NOMA transmissions of WTRU2 and WTRU3, while IM-RS(2) may allow measurements on NOMA transmissions of WTRU1 and WTRU3, etc.

An IM-RS pattern may be defined with its frequency/time location per NOMA transmission event, e.g., slot, periodicity, and/or applicable NOMA layer. An IM-RS with zero periodicity may be considered as a de-activated IM-RS process.

In a NOMA transmission, an IM-RS event for PUSCH may be implemented. One or more of the following may apply. An IM-RS event may occur for a PUSCH NOMA transmission where PUSCH power is set to zero. As such, the PUSCH transmission may occur without rate matching around the IM resources. Besides interference measurement, during the decoding, a gNB may utilize this information in decoding of the WTRU. A WTRU may autonomously activate or deactivate its IM-RS process, e.g., based on a criteria, threshold, etc., for example unless it is overridden by the gNB. An IM-RS event may be supported by rate matching of PUSCH information according to the IM-RS pattern. In examples, an IM-RS opportunity may be formed by a combination of the above-mentioned solutions.

An IM-RS pattern may be defined for a single WTRU or a group of WTRUs. A WTRU may receive an indication explicitly or implicitly to activate or deactivate IM-RS events, or change the IM-RS pattern.

A NOMA WTRU may be configured semi-statically or dynamically with information related to a specific IM-RS process. A WTRU may be configured, semi-statically or dynamically, with more than one IM-RS configurations, where each configuration may be represented by an index. An index may be dynamically indicated to a WTRU, or it may be determined from another NOMA configuration.

An IM-RS pattern may be determined from one or more of operational feature(s) or parameter(s) related to the NOMA operation. One or more of the following may apply. An IM-RS pattern may be determined from the determined set of PUSCH resources for NOMA transmission, e.g., REs. For example, different PUSCH NOMA resource sets may have a different associated IM-RS pattern. An IM-RS pattern may be linked to the determined MAS for NOMA transmission. For example, a MAS (e.g., each MAS) may have a one-to-one linkage with a IM-RS index. An IM-RS pattern may be adapted according to the retransmission index, e.g., such that for retransmission a more or less dense pattern for IM-RS may be used. An IM-RS pattern may be adapted according to the number of NOMA layers. In a multilayer NOMA transmission, the IM-RS pattern may be the same or different per layer. An IM-RS pattern may be adapted according to an RS downlink measurement. For example, an IM-RS may be deactivated if WTRU SNR drops below a preconfigured threshold. An IM-RS may be defined based on the configured or determined uplink DMRS configuration. For example, IM-RS resources may be determined in relation to the mapping location and/or periodicity of the uplink DMRS. The configuration for IM-RS may be determined based on traffic type, e.g., mMTC, URLLC, eMBB, etc., and/or the packet size. For example, an mMTC WTRU may be imposed with more IM-RS events to allow more measurement opportunities for other non-mMTC transmissions.

Figure 10:
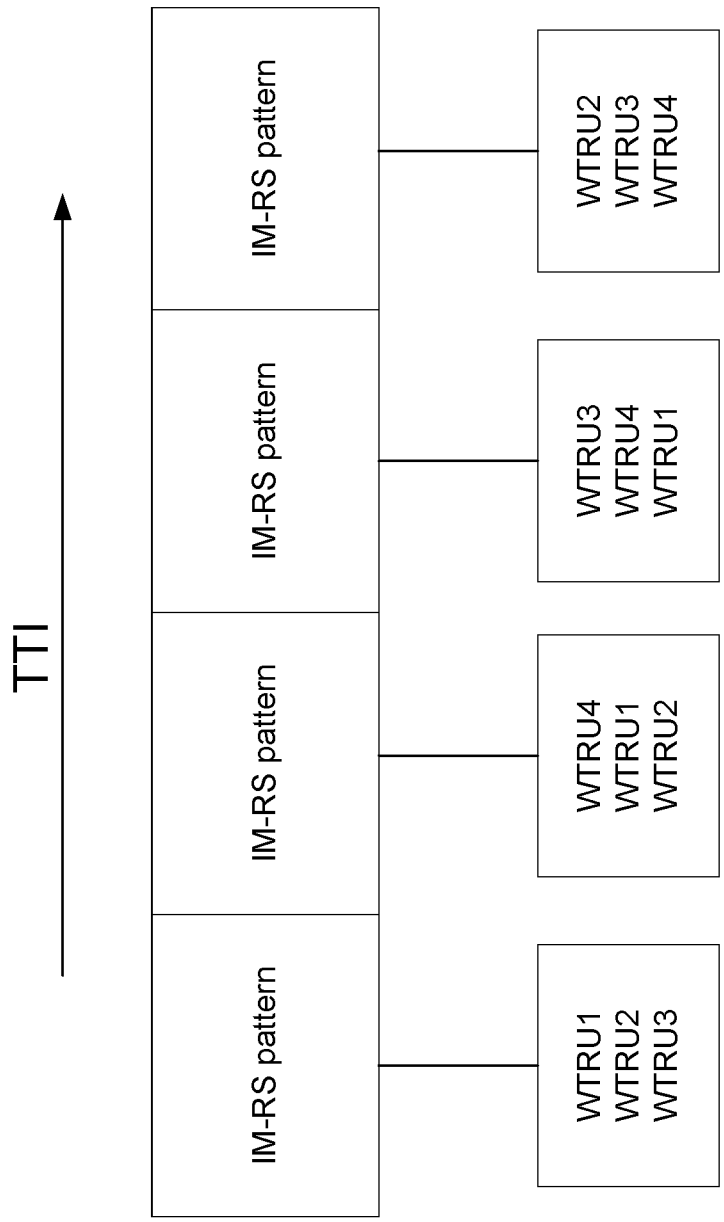
FIG. 10 illustrates an example of cycling of group IM-RS pattern.

A common IM-RS pattern may be reused within a group of WTRUs with different WTRU duty cycles, which may reduce overhead. The IM-RS pattern may comprise one common set of REs that may be identically defined for all WTRUs in the group and each WTRU in the group may periodically stop transmitting at different time intervals on the same resource. For example, with N users, an N TTI period may be used where each user may not transmit during 1/N TTIs. FIG. 10 illustrates an example of cycling of group IM-RS pattern. In the example of FIG. 10, N=4 WTRUs. In TTI 1, WTRU1, WTRU2, and WTRU3 perform NOMA transmission over the REs occupied by the IM-RS pattern while WTRU4 does not transmit on the REs occupied by the IM-RS pattern. The receiver acquires interference information from the sum of WTRU1, WTRU2, and WTRU3 which is useful for WTRU4's decoding. In TTI 2, WTRU 3 does not transmit and so on.

Although the features and elements of the present disclosure may consider LTE, LTE-A, New Radio (NR) or 5G specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in devices described herein.

The invention claimed is:
1. A wireless transmit/receive unit (WTRU), comprising:
a processor configured to:
apply a first perturbation pattern to a first transmission layer and a second perturbation pattern to a second transmission layer, wherein a difference is created between a first transmission power level associated with the first transmission layer and a second transmission power level associated with the second transmission layer based on the first and second perturbation patterns, wherein applying the first perturbation pattern to the first transmission layer comprises applying a first set of perturbation parameters to the first transmission layer in a first set of one or more transmission resources and applying the second perturbation pattern to the second transmission layer comprises applying a second set of perturbation parameters to the second transmission layer in a second set of one or more transmission resources; and
based on a determination to transmit the first transmission layer and the second transmission layer via a single antenna port:
transmit the first transmission layer via the single antenna port at the first transmission power level; and
transmit the second transmission layer via the single antenna port at the second transmission power level.

2. The WTRU of claim 1, wherein the processor being configured to apply the first perturbation pattern to the first transmission layer comprises the processor being configured to apply the first perturbation pattern to the first transmission layer on a symbol by symbol basis, and wherein the processor being configured to apply the second perturbation pattern to the second transmission layer comprises the processor being configured to apply the second perturbation pattern to the second transmission layer on the symbol by symbol basis.

3. The WTRU of claim 1, wherein the first set of perturbation parameters comprises a first power scaling factor and wherein the second set of perturbation parameters comprises a second power scaling factor.

4. The WTRU of claim 1, wherein the processor is configured to determine the first and second perturbation patterns based on a configuration received from a network.

5. The WTRU of claim 1, wherein the processor is configured to determine the first and second perturbation patterns based on a codebook or a seed configured by a network.

6. The WTRU of claim 5, wherein the codebook comprises multiple entries each corresponding to a perturbation pattern identified by an index and the processor is further configured to receive an indication of the index corresponding to the first or second perturbation pattern from the network.

7. The WTRU of claim 1, wherein the processor is configured to determine the first and second perturbation patterns based on one of more of a transmission zone associated with the first or second transmission layer, a transmission resource associated with the first or second transmission layer, a signature associated with the first or second transmission layer, a priority associated with the first or second transmission layer, or a transmission beam associated with the first or second transmission layer.

8. The WTRU of claim 1, wherein, based on a determination to transmit the first transmission layer and the second transmission layer via multiple antenna ports, the processor is further configured to:
    transmit at least a portion of the first transmission layer via a first antenna port at the first transmission power level; and
    transmit at least a portion of the second transmission layer via a second antenna port at the second transmission power level.

9. The WTRU of claim 1, wherein the processor is further configured to apply random precoding to the first and second transmission layers before transmitting the first and second transmission layers.

10. The WTRU of claim 1, wherein the first and second transmission layers are transmitted as non-orthogonal multiple access transmissions.

11. The WTRU of claim 1, wherein the processor is configured to apply the first and second perturbation patterns to the respective first and second transmission layers at a resource element level.

12. A method implemented by a wireless transmit/receive unit (WTRU), the method comprising:
    applying a first perturbation pattern to a first transmission layer and a second perturbation pattern to a second transmission layer, wherein a difference is created between a first transmission power level associated with the first transmission layer and a second transmission power level associated with the second transmission layer based on the first and second perturbation patterns, wherein applying the first perturbation pattern to the first transmission layer comprises applying a first set of perturbation parameters to the first transmission layer in a first set of one or more transmission resources and applying the second perturbation pattern to the second transmission layer comprises applying a second set of perturbation parameters to the second transmission layer in a second set of one or more transmission resources; and
    responsive to determining that the first transmission layer and the second transmission layer are to be transmitted via a single antenna port:
        transmitting the first transmission layer via the single antenna port at the first transmission power level; and
        transmitting the second transmission layer via the single antenna port at the second transmission power level.

13. The method of claim 12, wherein applying the first perturbation pattern to the first transmission layer comprises applying the first perturbation pattern to the first transmission layer on a symbol by symbol basis, and applying the second perturbation pattern to the second transmission layer comprises applying the second perturbation pattern to the second transmission layer on the symbol by symbol basis.

14. The method of claim 12, wherein the first set of perturbation parameters comprises a first power scaling factor and wherein the second set of perturbation parameters comprises a second power scaling factor.

15. The method of claim 12, wherein the first and second perturbation patterns are determined based on a seed or a codebook configured by a network.

16. The method of claim 12, further comprising, responsive to determining that the first transmission layer and the second transmission layer are to be transmitted via multiple antenna ports:
    transmitting at least a portion of the first transmission layer via a first antenna port at the first transmission power level; and
    transmitting at least a portion of the second transmission layer via a second antenna port at the second transmission power level.

17. The method of claim 12, wherein the first and second transmission layers are transmitted using a non-orthogonal multiple access transmission scheme.

18. A wireless transmit/receive unit (WTRU), comprising:
    a processor configured to:
    apply a first perturbation pattern to a first transmission layer and a second perturbation pattern to a second transmission layer, wherein applying the first perturbation pattern to the first transmission layer comprises applying a first set of perturbation parameters to the first transmission layer in a first set of one or more transmission resources and applying the second perturbation pattern to the second transmission layer comprises applying a second set of perturbation parameters to the second transmission layer in a second set of one or more transmission resources; and
    based on a determination to transmit the first transmission layer and the second transmission layer via a single antenna port:
        transmit the first transmission layer via the single antenna port at a first transmission power level created by at least the first perturbation pattern; and
        transmit the second transmission layer via the single antenna port at a second transmission power level created by at least the second perturbation pattern.

19. A wireless transmit/receive unit (WTRN), comprising: a processor configured to: apply a first perturbation pattern to a first transmission layer and a second perturbation pattern to a second transmission layer, wherein a difference is created between a first transmission a power level associated with the first transmission layer and a second transmission power level associated with the second transmission layer based on the first and second perturbation patterns; and based on a determination to transmit the first transmission layer and the second transmission layer via a single antenna port: transmit the first transmission layer via the single antenna port at the first transmission power level; and transmit the second transmission layer via the single antenna port at the second transmission power level, wherein the processor is configured to determine the first and second perturbation patterns based on a codebook or a seed configured by a network, wherein the codebook comprises multiple entries each corresponding to a perturbation pattern identified by an index and the processor is further configured to receive an indication of the index corresponding to the first or second perturbation pattern from the the network.

20. A wireless transmit/receive unit (WTRU), comprising: a processor configured to:
apply a first perturbation pattern to a first transmission layer and a second perturbation pattern to a second transmission layer, wherein a difference is created between a first transmission power level associated with the first transmission layer and a second transmission power level associated with the second transmission layer based on the first and second perturbation patterns; and
based on a determination to transmit the first transmission layer and the second transmission layer via a single antenna port:
transmit the first transmission layer via the single antenna port at the first transmission power level; and
transmit the second transmission layer via the single antenna port at the second transmission power level,
wherein the processor is further configured to apply random precoding to the first and second transmission layers before transmitting the first and second transmission layers.

* * * * *